United States Patent
Osborne et al.

(10) Patent No.: US 10,882,263 B2
(45) Date of Patent: Jan. 5, 2021

(54) METHOD FOR IMPREGNATING A PREFORM WITH RESIN UTILIZING A CAUL PLATE HAVING A CHANNEL FOR DISTRIBUTING RESIN

(71) Applicant: The Boeing Company, Chicago, IL (US)

(72) Inventors: Max Osborne, Melbourne (AU); Jason McBain, Melbourne (AU)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 15/940,074

(22) Filed: Mar. 29, 2018

(65) Prior Publication Data

US 2019/0299548 A1     Oct. 3, 2019

(51) Int. Cl.
| | |
|---|---|
| *B29C 70/54* | (2006.01) |
| *B29C 70/34* | (2006.01) |
| *B29L 31/30* | (2006.01) |
| *B29K 101/10* | (2006.01) |
| *B29C 70/48* | (2006.01) |

(52) U.S. Cl.
CPC .......... *B29C 70/548* (2013.01); *B29C 70/342* (2013.01); *B29C 70/48* (2013.01); *B29K 2101/10* (2013.01); *B29K 2995/0096* (2013.01); *B29L 2031/3076* (2013.01)

(58) Field of Classification Search
CPC ..... B29C 70/548; B29C 70/342; B29C 70/48; B29L 2031/3076; B29K 2995/0096; B29K 2101/10
See application file for complete search history.

(56) References Cited

U.S. PATENT DOCUMENTS

| | | | |
|---|---|---|---|
| 7,951,318 B2 | 5/2011 | Hanson | |
| 9,682,514 B2 | 6/2017 | Lockett et al. | |
| 2002/0185785 A1* | 12/2002 | Thrash | B29C 70/48 |
| | | | 264/571 |

FOREIGN PATENT DOCUMENTS

| | | | | |
|---|---|---|---|---|
| EP | 2346674 B1 * | 12/2018 | ........... | B29C 70/548 |
| WO | WO-2007054315 A1 * | 5/2007 | ........... | B29C 70/546 |

OTHER PUBLICATIONS

NetComposites; Composite materials guide: Repair-Repairing Tooling; Jan. 30, 2018.
Resin Infusion Spiral Tubing; https://trojanfibreglass.com; Feb. 26, 2018.

* cited by examiner

*Primary Examiner* — William P Fletcher, III
(74) *Attorney, Agent, or Firm* — Duft & Bornsen, PC

(57) ABSTRACT

Systems and methods for fabricating composite parts. One embodiment is a method that includes selecting a caul plate having a body and a trough disposed at a side of the body which defines a channel that hangs beneath the body, the caul plate further having an opening disposed between the trough and the lower surface to form a fluid pathway for resin within the channel to exit into a preform. The method also includes placing the caul plate atop a preform of dry fiber and aligning the channel with a periphery of the preform, placing resin into the trough, and impregnating the preform with resin from the trough.

20 Claims, 9 Drawing Sheets

METHOD FOR IMPREGNATING A PREFORM WITH RESIN UTILIZING A CAUL PLATE HAVING A CHANNEL FOR DISTRIBUTING RESIN

FIELD

The disclosure relates to the field of composite parts, and in particular, to caul plates for composite parts.

BACKGROUND

Composite parts, such as Carbon Fiber Reinforced Polymer (CFRP) parts, are initially laid-up in multiple layers that together form a laminate. Individual fibers within each layer of the laminate are aligned parallel with each other, but different layers may exhibit different fiber orientations in order to increase the strength of the resulting composite along different dimensions. In further composite parts, fibers may be woven or braided, resulting in multiple fiber directions per layer. The laminate may include a liquid resin, such as a thermoset or thermoplastic resin that solidifies in order to harden the laminate into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with resin but may include a tackifier or binder. Dry fiber may be infused with resin prior to curing. For thermoset resins, the hardening is a one-way process referred to as curing, while for thermoplastic resins, the resin may return to liquid form if it is re-heated.

Laminates of dry fiber may be referred to as "preforms," and may be laid-up onto tooling in order to conform a lower surface of the preform with a desired contour. Furthermore, caul plates may be placed atop a preform to ensure that a top surface of the preform maintains a desired shape and forms a smooth aerodynamic surface. For example, a laminate may be applied to an Inner Mold Line (IML) mandrel. However, the process of infusing resin into a preform remains a complicated process that requires the use of sacrificial resin distribution media. This process is complicated for preforms that use a caul plate, because the distribution media must be carefully laid-up and aligned each time a preform is fabricated, which is time consuming.

Therefore, it would be desirable to have a method and apparatus that take into account at least some of the issues discussed above, as well as other possible issues.

SUMMARY

Embodiments described herein provide caul plates that define integral resin distribution channels. These features enable technicians to reduce or forego the use of sacrificial resin distribution media, and further ensure that resin distribution processes are always aligned with the caul plate. This saves time for technicians that are fabricating composite parts, and also reduces cost.

One embodiment is a method that includes selecting a caul plate having a body and a trough disposed at a side of the body which defines a channel that hangs beneath the body, the caul plate further having an opening disposed between the trough and the lower surface to form a fluid pathway for resin within the channel to exit into a preform. The method also includes placing the caul plate atop a preform of dry fiber and aligning the channel with a periphery of the preform, placing resin into the trough, and impregnating the preform with resin from the trough.

A further embodiment is an apparatus comprising a caul plate for a composite part. The caul plate includes a body that includes a lower surface which defines a contour for cured composite part, a trough that extends along a side of the body and defines a channel that hangs beneath the body, and an opening disposed between the trough and the lower surface to form a fluid pathway for resin within the channel to exit into a preform.

Another embodiment is a system comprising a caul plate. The caul plate includes a body that includes a lower surface which defines a contour for a preform that will be cured into a composite part, a trough that extends along a side of the body and defines a channel that hangs beneath the body, and an opening disposed between the trough and the lower surface to form a fluid pathway for resin within the channel to exit into a preform. The system also includes a reservoir of resin for filling the trough.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
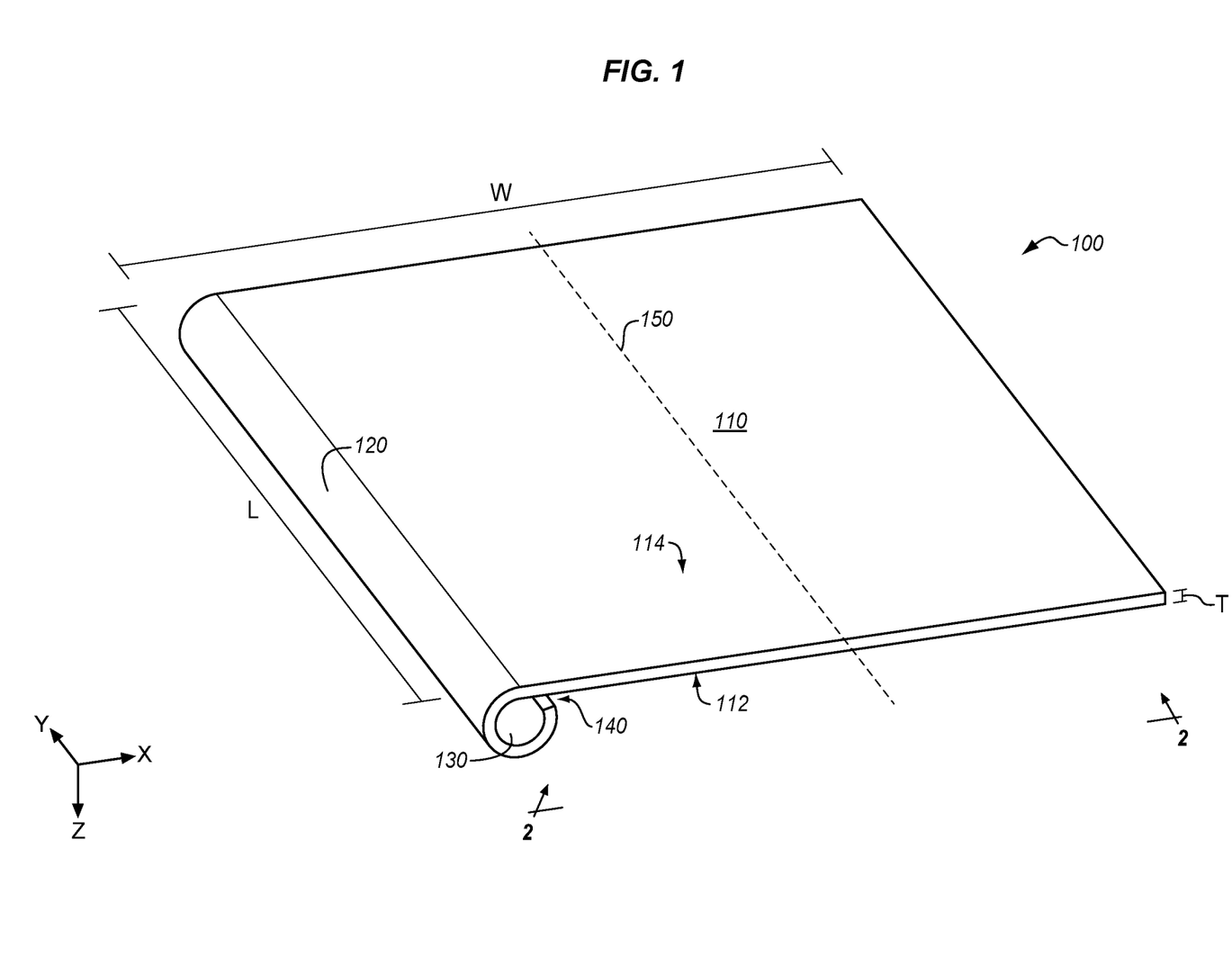
FIG. 1 is a perspective view of a caul plate in an illustrative embodiment.

FIG. 1 is a perspective view of a caul plate 100 in an illustrative embodiment. Caul plate 100 comprises any component that defines a shape for a surface of a preform. In this embodiment, caul plate 100 includes a trough 120 that defines a channel 130 for distributing resin into a preform. Because at least some of channel 130 is disposed beneath opening 140, resin drawn into channel 130 will fill channel 130 along the length L of caul plate 100 before exiting through opening 140. In one embodiment, L is between half a meter and two meters. After channel 130 has been filled, resin is drawn evenly along the length L of caul plate 100 across the width W of caul plate 100.

Caul plate 100 further includes body 110, which may be integral with or attached to trough 120, and is shaped to a desired contour for a composite part. For example, body 110 may be shaped flat, curved along one dimension, curved along multiple dimensions (e.g., in a complex contour), etc. Lower surface 112 conforms against the preform and defines a contour for the preform (e.g., an Outer Mold Line (OML), while upper surface 114 does not. For example, lower surface 112 may define an aerodynamically smooth surface contour (i.e., a contour having surface or finish that results in a roughness of less than two hundred and fifty μinch Ra). Body 110 may be shaped from a flexible sheet or rigid sheet of material having a thickness T, for example in a range between ten and two hundred thousandths of an inch. Furthermore, body 110 and trough 120 may be formed from the same sheet of material.

With body 110 and trough 120 described, it will be understood that lower surface 112 and trough 120 define edges of opening 140, such that opening 140 is in communication with channel 130. Opening 140 is disposed beneath the lower surface 112, and enables fluid to exit the channel 130 towards a midline 150 of caul plate 100. Phrased another way, opening 140 is disposed between trough 120 and lower surface 112, and forms a fluid pathway for resin within channel 130 to exit.

Caul plate 100 may be made from any suitable rigid material, such as steel, aluminum, etc. In some embodiments, caul plate 100 is made from an elastically deformable shape memory material, such as spring steel. In still further embodiments, caul plate 100 may itself be made of a composite material.

Figure 2:
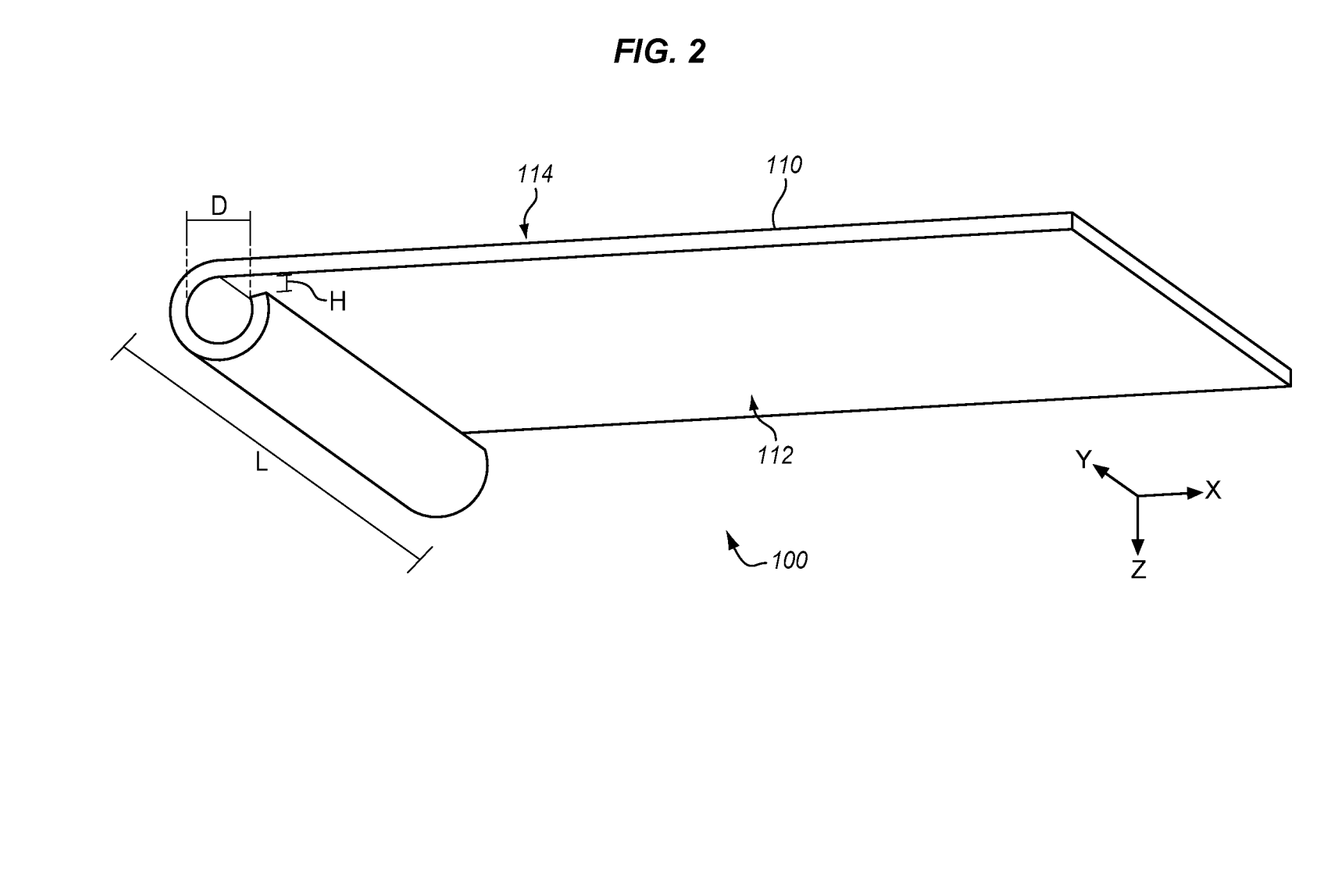
FIG. 2 is a view of a caul plate in an illustrative embodiment.

FIG. 2 is a view of caul plate 100 in an illustrative embodiment. Specifically, FIG. 2 is a perspective view that corresponds with view arrows 2 of FIG. 1. FIG. 2 illustrates that trough 120 continues along the length of caul plate 100. Thus, channel 130 and opening 140 also continue across the length of caul plate 100. Channel 130 has a diameter D and opening 140 has a height H. In some embodiments, the ratio of H to D may be between one half and one eighth, and the ratio of H to L may be between on fiftieth and one five hundredth.

Figure 3:
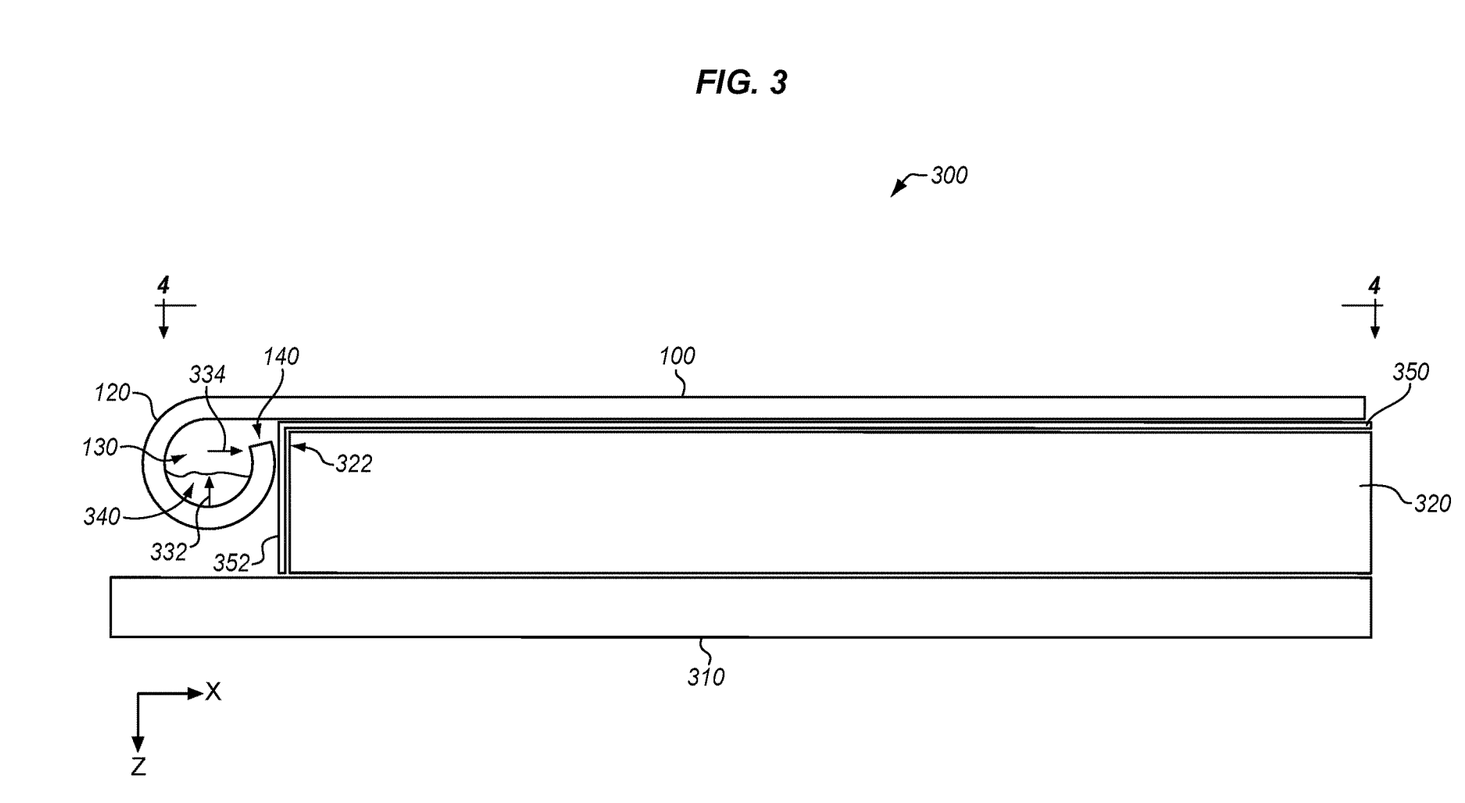
FIG. 3 is a side view of a composite fabrication system that utilizes a caul plate in an illustrative embodiment.

FIG. 3 is a side view of a composite fabrication system 300 that utilizes a caul plate in an illustrative embodiment. As shown in FIG. 3, a mandrel 310 forms the base of composite fabrication system 300, and may form an Inner Mold Line (IML) for preform 320. Preform 320 of dry fiber (e.g., carbon fiber, or fiberglass) is laid-up atop mandrel 310, and may have a thickness between one tenth of an inch and two inches. Peel ply 350 is laid atop (e.g., directly atop) preform 320. In embodiments where peel ply 350 is resin permeable, peel ply 350 also includes segment 352, which is disposed between channel 130 and preform 320. In further embodiments, a continuous tooling surface that is larger than preform 320 may be used. In such configurations, channel 130 may sit above the surface of mandrel 310 and opening 140 is smaller than the height of preform 320. Most of channel 130 is disposed beneath preform 320, while opening 140 is vertically aligned with periphery 322 of preform 320 (i.e., along Z). Thus, even though body 110 of caul plate 100 is separated from preform 320 via peel ply 350, caul plate 100 may still distribute resin to preform 320. Specifically, resin 340 applied to channel 130 fills channel 130 vertically as indicated by arrow 332, and then proceeds laterally across preform 320 as indicated by arrow 334. The resin 340 may be drawn, for example, by applying a vacuum to the right side of preform 320.

Figure 4A:
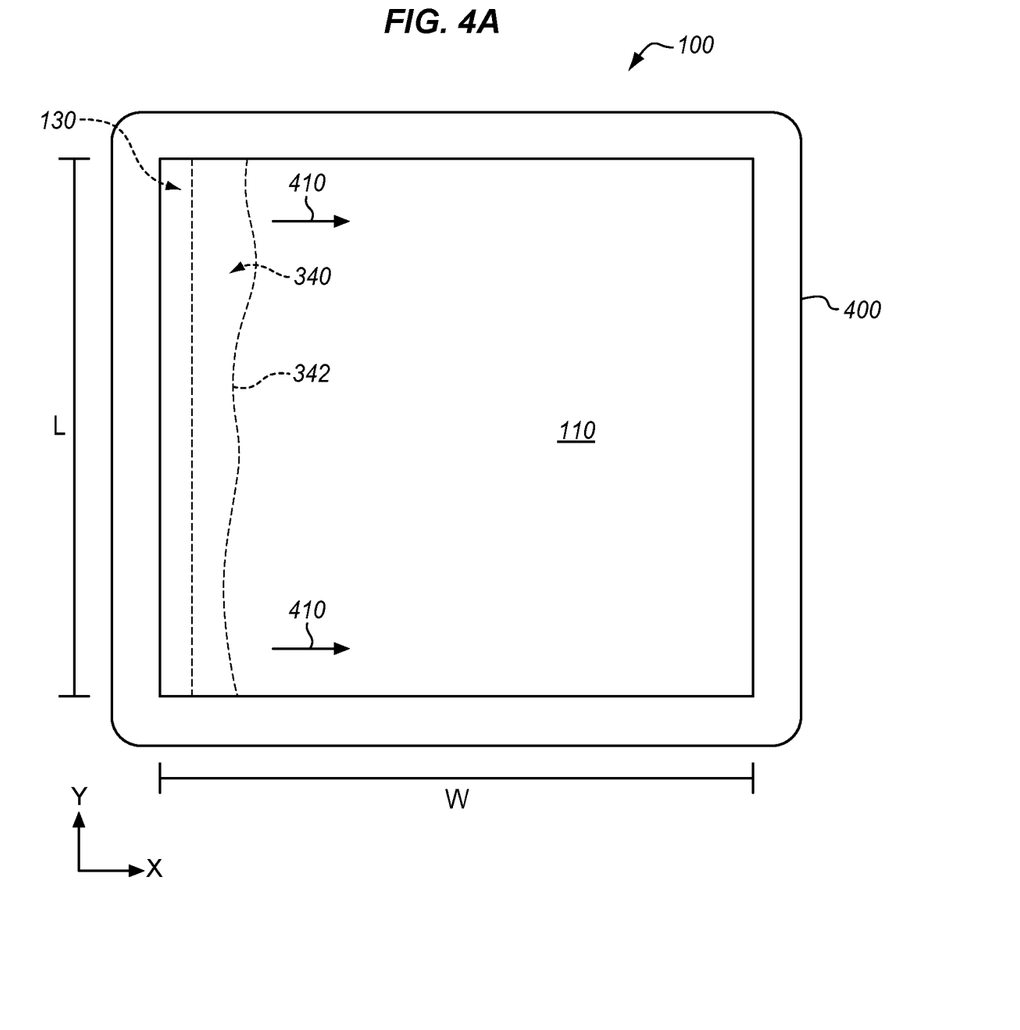
FIGS. 4A-4B are views of resin distribution via a caul plate in an illustrative embodiment.
Figure 4B:
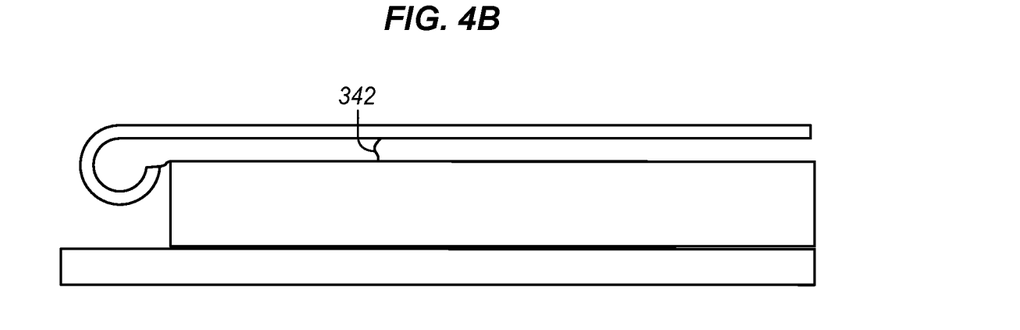

To illustrate how resin 340 flows across preform 320, FIG. 4A is provided. FIG. 4A is a top view of resin distribution via caul plate 100 in an illustrative embodiment, and corresponds with view arrows 4 of FIG. 3. FIG. 4A illustrates that a vacuum bag 400 has been placed over caul plate 100. As shown in FIG. 4A, resin 340 proceeds laterally along X as indicated by arrows 410 and by wavefront 342. FIG. 4B is a cutaway view indicated by view arrows 4B of FIG. 4A. In FIG. 4B, certain dimensions have been exaggerated and items have been omitted to better ensure that wavefront 342 is clearly visible. The distribution process is evenly applied across the length L of caul plate 100. However, in some embodiments where preform 320 varies in thickness, resin may be distributed at a uniform rate of mass and hence a non-uniform linear rate. Hence, the rate of progress of wavefront 342 is somewhat dependent upon the thickness of preform 320.

With a discussion of the various components of a composite fabrication system 300 provided above, further discussion illustrates how caul plate 100 may be utilized to distribute resin in an illustrative embodiment. Specifically, illustrative details of the operation of composite fabrication system 300 will be discussed with regard to FIG. 5. Assume, for this embodiment, that a technician or Automated Dry Fiber Placement (ADFP) machine is in the process of preparing a preform 320 that will be infused with resin 340 and cured into a composite part.

Figure 5:
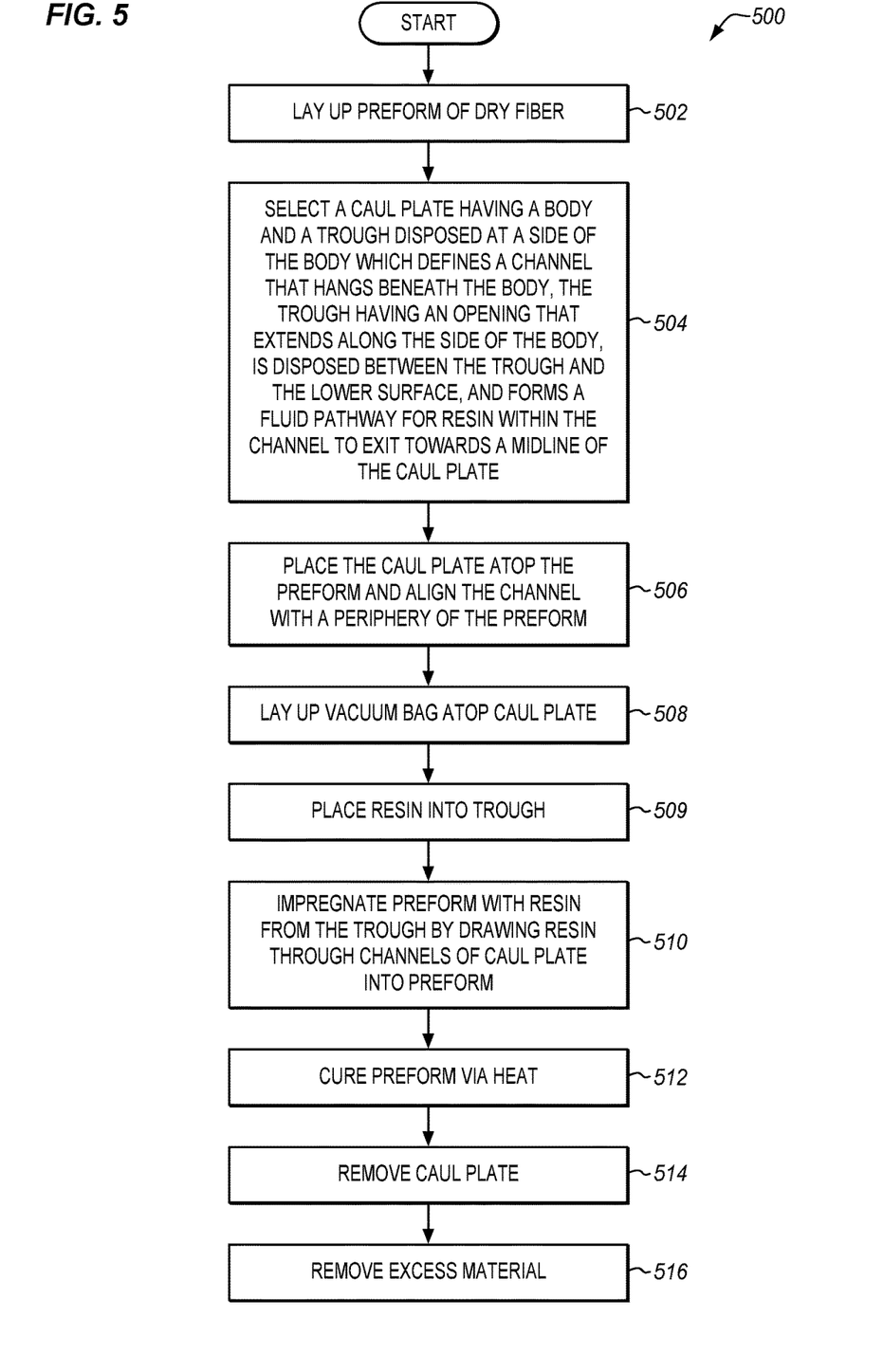
FIG. 5 is a flowchart illustrating a method for fabricating a composite part via the use of a caul plate with an integral channel in an illustrative embodiment.

FIG. 5 is a flowchart illustrating a method 500 for fabricating a composite part via the use of a caul plate 100 with a channel 130 in an illustrative embodiment. The steps of method 500 are described with reference to caul plate 100 of FIG. 1, but those skilled in the art will appreciate that method 500 may be performed in other systems as desired. The steps of the flowcharts described herein are not all inclusive and may include other steps not shown. The steps described herein may also be performed in an alternative order.

Preform 320 is laid-up into a desired shape by a technician or automated system, such as an Automated Fiber Placement (AFP) machine (step 502). Peel ply 350 is applied directly atop preform 320. Thus, preform 320 is ready to receive a caul plate. Caul plate 100 is selected (step 504). As discussed above, caul plate 100 includes body 110 and trough 120, which is disposed at a side of body 110. Trough 120 defines channel 130, which hangs beneath body 110. Furthermore, caul plate 100 includes an opening 140 that extends along the side of body 110, is disposed between trough 120 and lower surface 112, and forms a fluid pathway for resin within channel 130 to exit into preform 320 (e.g., towards midline 150 of caul plate 100).

Caul plate 100 is placed atop preform 320 (e.g., directly atop peel ply 350, or atop a resin distribution media that sits atop peel ply 350) and channel 130 is aligned with a periphery 322 of preform 320 (step 506). Caul plate 100 may be separated from preform 320 by, for example, a release film or peeling of the peel ply in order to facilitate removal of caul plate 100 from a resulting composite part. When caul plate 100 is placed in this manner, a majority of trough 120 is located beneath preform 320. Hence, channel 130 (which is defined by trough 120 of caul plate 100) also hangs below peel ply 350. In this orientation, opening 140 is aligned vertically with preform 320. Resin 340 may penetrate through peel ply 350 when resin 340 is drawn into preform 320. Resin 340 that fills channel 130 may travel directly into preform 320. In further embodiments, channel 130 may be sealed against preform 320 to prevent leakage of resin from exceeding a desired amount.

With caul plate 100 in place, vacuum bag 400 is laid-up atop caul plate 100 (step 508). Vacuum may be applied to preform 320 for a period of time to remove air in the preform. After this evacuation, a tap (not shown) may be opened to allow resin to flow from the reservoir into trough 120 and then into preform 320. The reservoir may be held at a pressure of more than zero and less than one atmosphere. If the reservoir is at a vacuum, there is no pressure gradient to push the resin through the part. If the reservoir and therefore infused resin is at more than one atmosphere, the vacuum bag no longer applies pressure to the layup. Channel 130 of caul plate 100 is coupled with the reservoir of resin and resin is placed into the trough from the reservoir (step 509). Vacuum applied via vacuum bag 400 draws resin 340 from the reservoir into channel 130. For example, vacuum applied to a right side of preform 320 and/or peel ply 350 shown in FIG. 3 may draw resin through preform 320. Alternatively, resin 340 may be pumped into channel 130. In either case, preform 320 is impregnated with resin from the trough, for example by resin 340 being drawn by pressure through channel 130 of caul plate 100 to fills channel 130, and travel via opening 140 into preform 320 (step 510). During this process, resin is prevented from overfilling preform 320 due to pressure from a vacuum bag. This pressure acts through caul plate 100. After preform 320 is impregnated with resin, preform 320 is cured via heat into a composite part (step 512). Caul plate 100 is removed from the composite part (step 514), and excess resin 516 is also removed from the composite part.

During this process, resin is prevented from overfilling preform 320 due to pressure from the vacuum bag. Changing the infusion pressure (reservoir pressure) can change the resulting thickness and fiber volume fraction of the resulting composite part. Typically, the part will include a resin outlet at the location where it should fill last. Once resin is found at this outlet, the infusion is complete. Hence, according to these processes, it is not necessary to infuse a specific 'required' amount of resin, as any excess flows into the outlet.

Method 500 provides a substantial benefit over prior techniques because caul plate 100 removes the need for separate resin distribution components, and further removes the need for alignment of those components with the rest of composite fabrication system 300. This saves both materials and labor during the fabrication process, reducing the overall cost of composite parts fabricated via caul plate 100.

Figure 6:
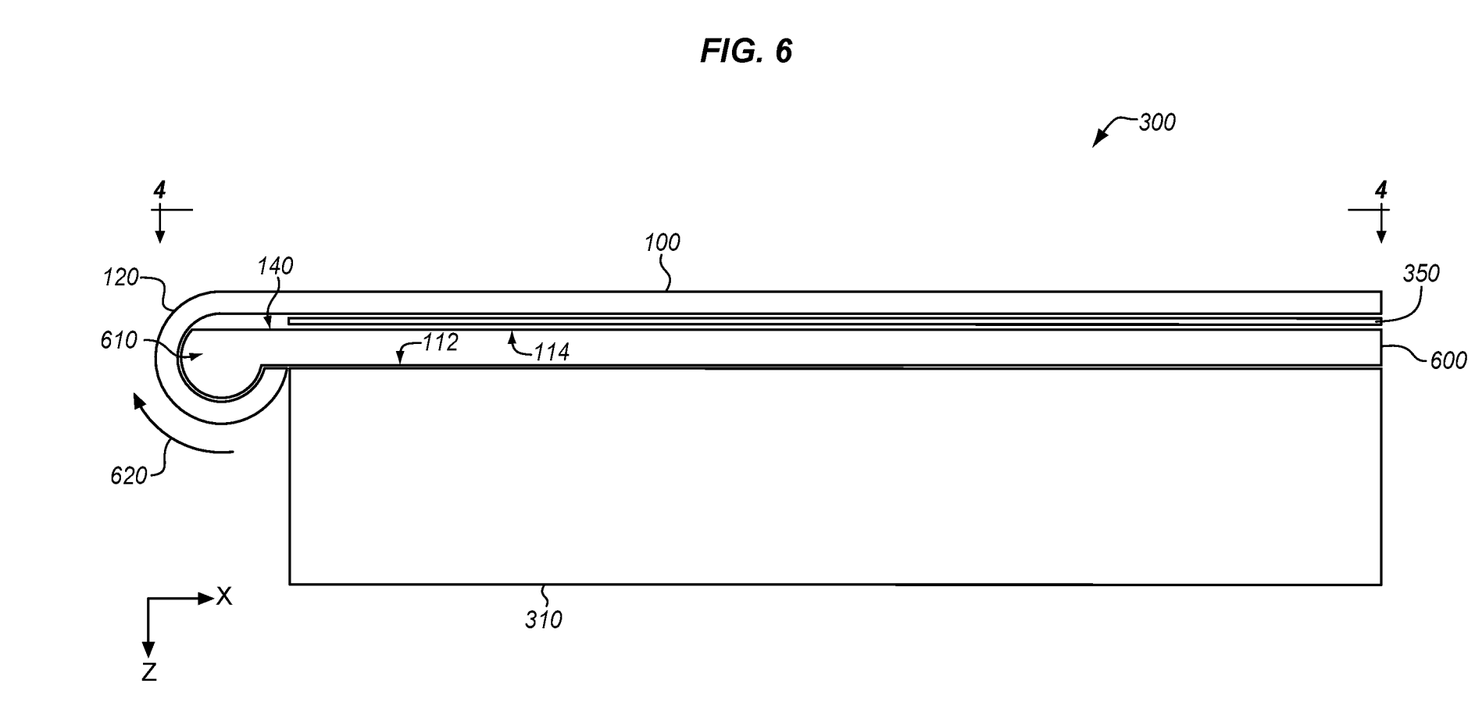
FIG. 6 is a side view of a composite fabrication system that has fabricated a composite part in an illustrative embodiment.

FIG. 6 is a side view of a composite fabrication system that has fabricated a composite part 600 in an illustrative embodiment. In this embodiment, composite part 600 includes prong 610, which comprises excess material formed from resin that was trapped within channel 130 during curing. In order to remove prong 610, trough 120 may be deformed or deflected according to arrow 620, and caul plate 100 may be removed from composite part 600. Prong 610 may then be removed via sanding, cutting, etc.

Figure 7:
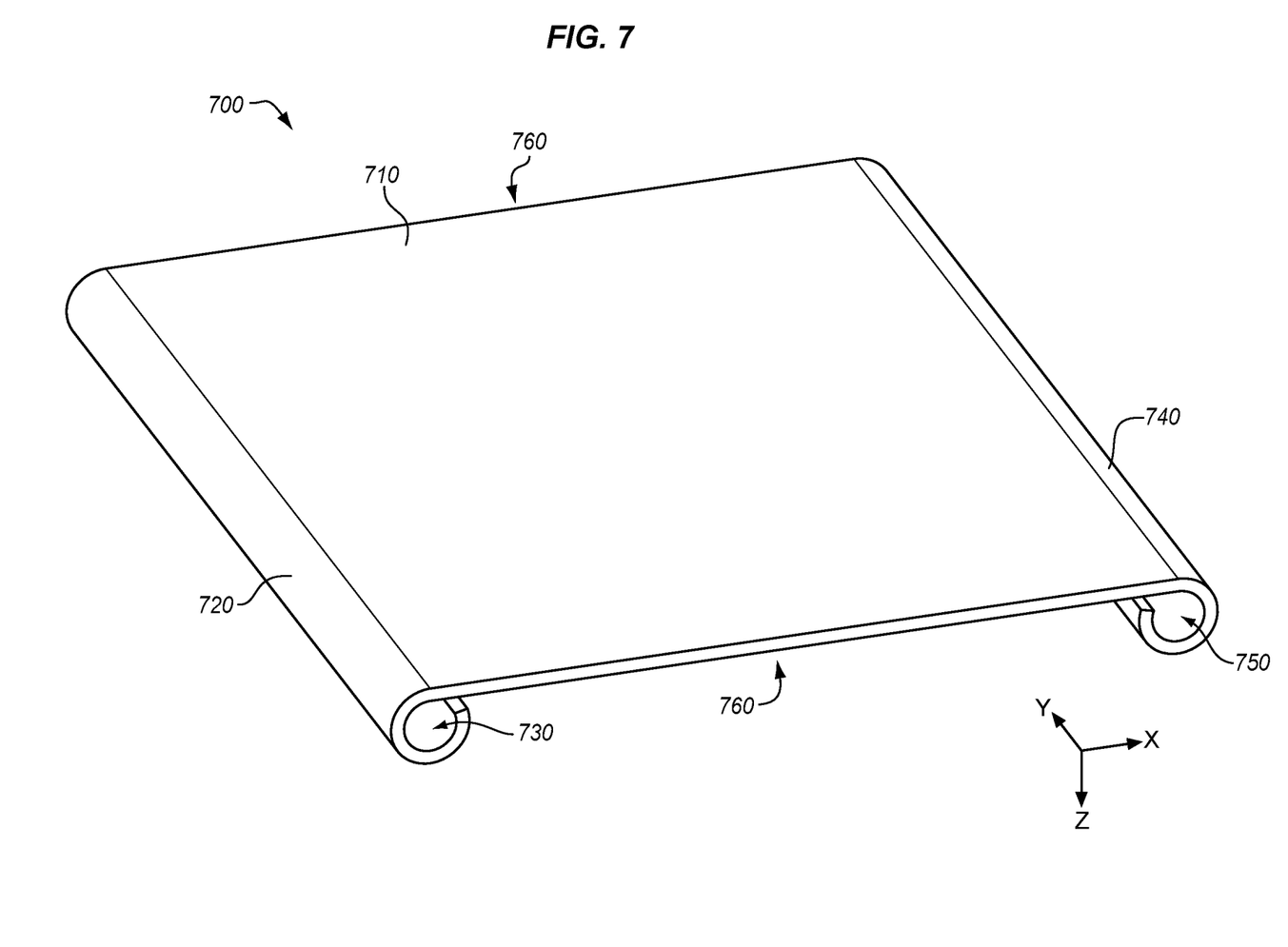
FIG. 7 is a perspective view of a further caul plate in an illustrative embodiment.

FIG. 7 is a perspective view of a further caul plate 700 in an illustrative embodiment. Caul plate 700 includes trough 720 as well as an additional trough 740. Trough 720 defines a channel 730, while additional trough 740 defines an additional channel 750. Further versions of caul plates may include channels on any suitable number of sides as desired. In FIG. 7, vacuum may be drawn at locations 760 in order to draw resin from both channels.

EXAMPLES

In the following examples, additional processes, systems, and methods are described in the context of a composite fabrication system.

Figure 8:
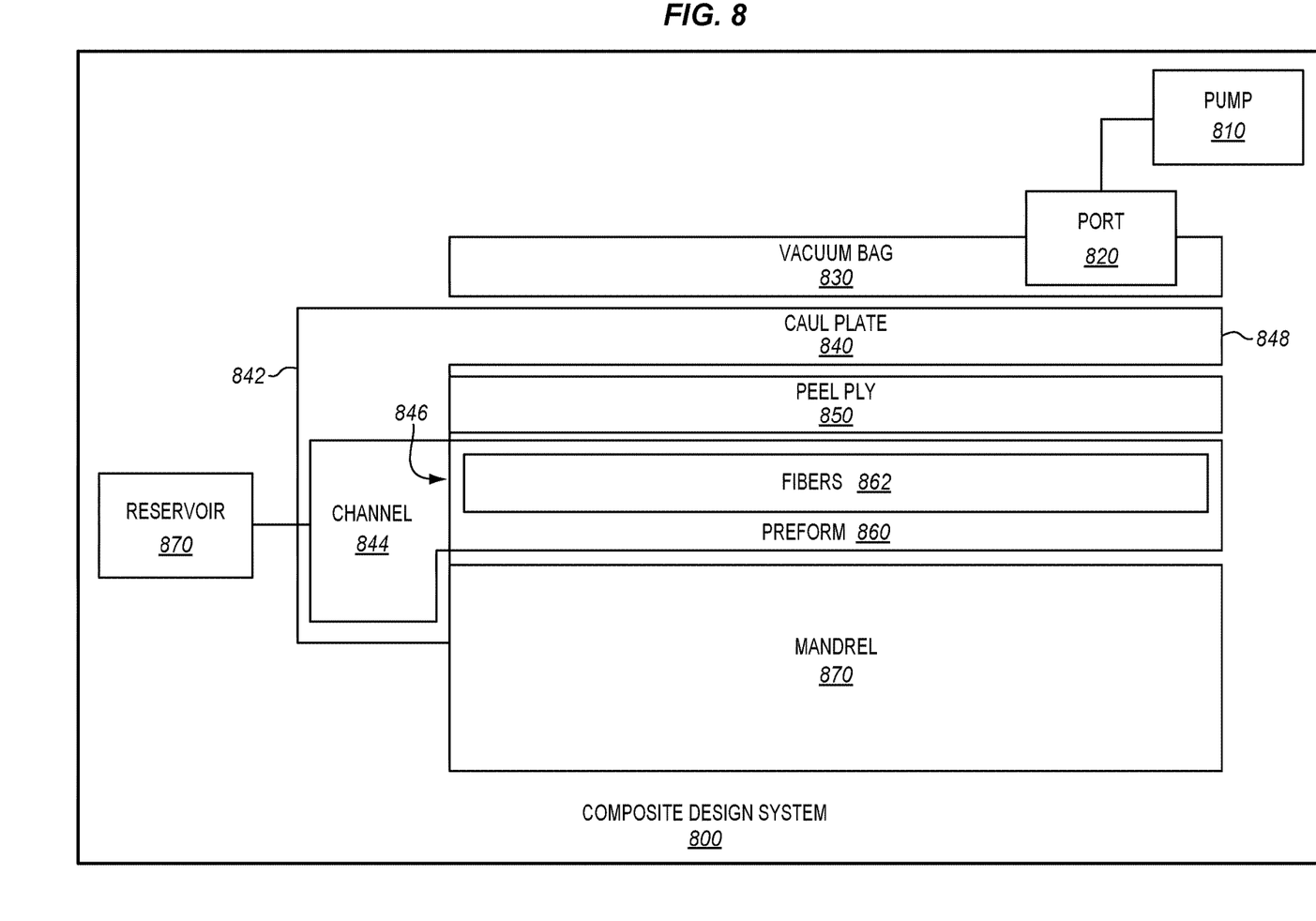
FIG. 8 is a block diagram of a composite fabrication system in an illustrative embodiment.

FIG. 8 is a block diagram of a composite fabrication system 800 in an illustrative embodiment. According to FIG. 8, composite fabrication system 800 includes pump 810 which applies vacuum via port 820. For example, pump 810 may apply a full vacuum, or a differential pressure in a range between one half and one atmosphere. The infusion pressure for the resin may vary. Vacuum bag 830 is gas-impermeable, and covers the caul plate 840. Body 848 of caul plate 840 is directly atop peel ply 850, which facilitates the release of caul plate 840 from preform 860. Trough 842 of caul plate 840 defines channel 844, through which resin from reservoir 870 flows. Opening 846 is aligned with preform 860, such that resin from channel 844 may flow into preform 860. Mandrel 880 is located beneath preform 860. In one embodiment, pump 810 and reservoir 870 include electronic controllers that manage their operations.

Figure 9:
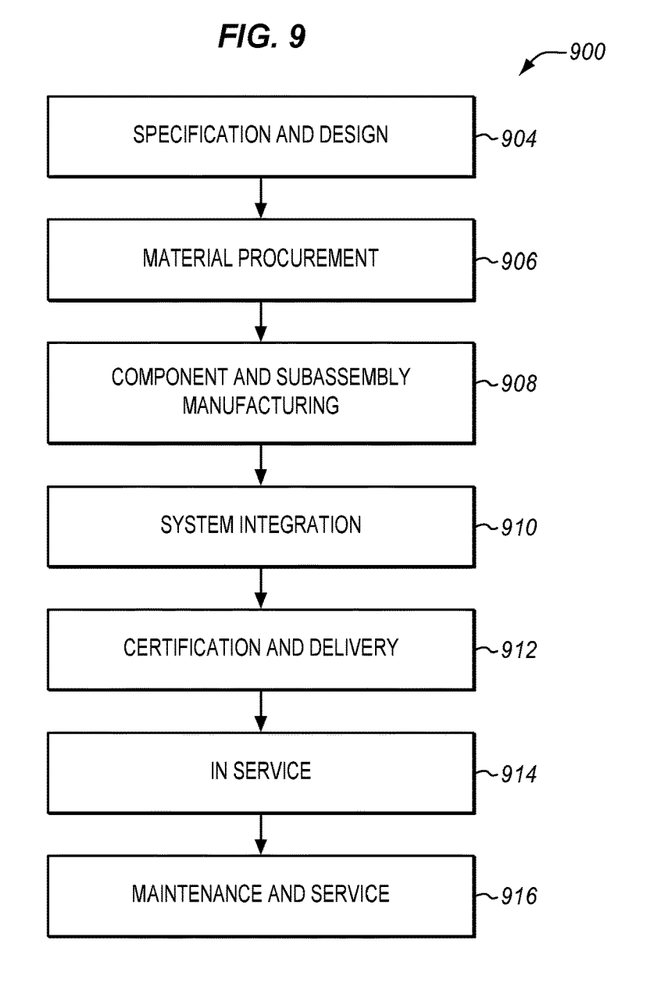
FIG. 9 is a flow diagram of aircraft production and service methodology in an illustrative embodiment.
Figure 10:
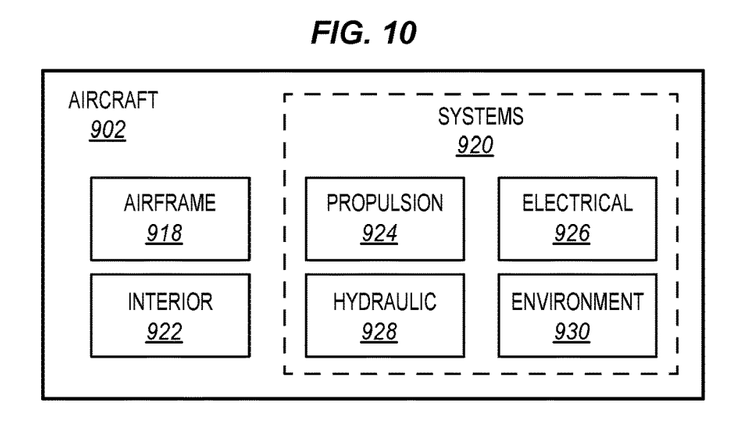
FIG. 10 is a block diagram of an aircraft in an illustrative embodiment.

Referring more particularly to the drawings, embodiments of the disclosure may be described in the context of an aircraft manufacturing and service method 900 as shown in FIG. 9 and an aircraft 902 as shown in FIG. 10. During pre-production, illustrative method 900 may include specification and design 904 of the aircraft 902 and material procurement 906. During production, component and subassembly manufacturing 908 and system integration 910 of the aircraft 902 takes place. Thereafter, the aircraft 902 may go through certification and delivery 912 in order to be placed in service 914. While in service by a customer, the aircraft 902 is scheduled for routine maintenance and service 916 (which may also include modification, reconfiguration, refurbishment, and so on). Apparatus and methods embodied herein may be employed during any one or more suitable stages of the production and service method 900 (e.g., specification and design 904, material procurement 906, component and subassembly manufacturing 908, system integration 910, certification and delivery 912, service 914, maintenance and service 916) and/or any suitable component of aircraft 902 (e.g., airframe 918, systems 920, interior 922, propulsion 924, electrical 926, hydraulic 928, environmental 930).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 902 produced by illustrative method 900 may include an airframe 918 having various aero surfaces such as wing skins, fuselage panels, leading and trailing edge surfaces, control surfaces, engine cowls and fairings. Airframe 918 may be accompanied by a plurality of systems 920 and an interior 922. Examples of high-level systems 920 include one or more of a propulsion system 924, an electrical system 926, a hydraulic system 928, and an environmental system 930. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 900. For example, components or subassemblies corresponding to production stage 908 may be fabricated or manufactured in a manner similar to components or subassemblies produced while the aircraft 902 is in service. Also, one or more apparatus embodiments, method embodiments, or a combination thereof may be utilized during the production stages 908 and 910, for example, by substantially expediting assembly of or reducing the cost of an aircraft 902. Similarly, one or more of apparatus embodiments, method embodiments, or a combination thereof may be utilized while the aircraft 902 is in service, for example and without limitation, to maintenance and service 916. For example, the techniques and systems described herein may be used for steps 906, 908, 910, 914, and/or 916, and/or may be used for airframe 918 and/or interior 922. These techniques and systems may even be utilized for systems 920, including for example propulsion 924, electrical 926, hydraulic 928, and/or environmental 930.

In one embodiment, a part comprises a portion of airframe 918, and is manufactured during component and subassembly manufacturing 908. The part may then be assembled into an aircraft in system integration 910, and then be utilized in service 914 until wear renders the part unusable. Then, in maintenance and service 916, the part may be discarded and replaced with a newly manufactured part. Inventive components and methods may be utilized throughout component and subassembly manufacturing 908 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
   selecting a caul plate having a body and a trough disposed at a side of the body which defines a channel that hangs beneath the body, the caul plate further having an opening disposed between the trough and a lower surface of the body to form a fluid pathway for resin within the channel to exit into a preform;
   placing the caul plate atop a preform of dry fiber and aligning the channel with a periphery of the preform;
   placing resin into the trough; and
   impregnating the preform with resin from the trough.

2. The method of claim 1 further comprising:
   laying up a vacuum bag atop the caul plate;
   drawing resin through the channel into the preform;
   curing the preform into a composite part via heat; and
   removing the caul plate from the composite part.

3. The method of claim 2 wherein:
   drawing resin comprises utilizing pressure to draw the resin from the channel through the opening into the preform.

4. The method of claim 1 further comprising:
   removing excess material from a composite part formed from the preform.

5. The method of claim 1 further comprising:
   coupling the channel with a reservoir of the resin.

6. The method of claim 1 wherein:
   the caul plate defines an outer mold line (OML) for a composite part.

7. The method of claim 6 wherein:
   the caul plate defines an aerodynamically smooth surface.

8. The method of claim 1 wherein:
   the resin comprises a thermoset resin.

9. The method of claim 1 further comprising:
   removing the caul plate from a composite part formed from the preform, by deflecting a trough of the caul plate from the composite part.

10. The method of claim 9 wherein:
    the caul plate defines the channel.

11. The method of claim 1 further comprising:
    applying a vacuum to the preform.

12. The method of claim 11 wherein:
    applying the vacuum draws resin through the preform.

13. The method of claim 1 further comprising:
    controlling an infusion pressure at which the preform is impregnated with the resin.

14. The method of claim 1 further comprising:
    opening a tap that allows the resin to flow into the trough from a reservoir.

15. The method of claim 1 further comprising:
    curing the preform into a composite part via heat; and
    removing a prong from the composite part at a location of the channel.

16. The method of claim 1 wherein:
impregnating the preform with resin from the trough comprises impregnating the preform with thermoplastic resin.

17. The method of claim 1 wherein:
placing the caul plate comprises placing spring steel.

18. The method of claim 1 further comprising:
laying a peel ply atop the preform.

19. The method of claim 18 further comprising:
disposing a segment of the peel ply between the channel and the preform.

20. The method of claim 19 further comprising:
drawing resin through the segment of the peel ply.

* * * * *